United States Patent [19]
Suzuki et al.

[11] Patent Number: 5,644,650
[45] Date of Patent: Jul. 1, 1997

[54] METHOD AND APPARATUS FOR DIGITALLY DISPLAYING AN ENHANCED X-RAY IMAGE

[75] Inventors: Masakazu Suzuki; Keisuke Mori; Akifumi Tachibana, all of Kyoto, Japan

[73] Assignee: J. Morita Manufacturing Corporation, Kyoto, Japan

[21] Appl. No.: 397,581

[22] Filed: Mar. 2, 1995

[30] Foreign Application Priority Data

Apr. 6, 1994 [JP] Japan .................. 6-068791

[51] Int. Cl.$^6$ .................. G06K 9/36
[52] U.S. Cl. .................. 382/132; 382/274
[58] Field of Search .................. 382/132, 162, 382/254, 274; 364/413.13; 379/98, 98.2, 98.7

[56] References Cited

U.S. PATENT DOCUMENTS

| | | | |
|---|---|---|---|
| 4,229,764 | 10/1980 | Danos | 358/160 |
| 4,302,672 | 11/1981 | Kato et al. | 250/327.1 |
| 5,164,993 | 11/1992 | Capozzi et al. | 382/6 |

FOREIGN PATENT DOCUMENTS

| | | | |
|---|---|---|---|
| 0632406 | 1/1995 | European Pat. Off. | G06T 5/40 |
| 3910338 | 10/1989 | Germany | G06F 3/147 |
| 60-173540 | 9/1985 | Japan | 382/274 |
| 1-261787 | 10/1989 | Japan | G06F 15/62 |
| 4-18714 | 7/1992 | Japan | A61B 6/00 |
| 2210533 | 6/1989 | United Kingdom | H04N 9/43 |
| 217157 | 10/1989 | United Kingdom | G06F 3/153 |
| 2267633 | 12/1993 | United Kingdom | H04N 1/467 |

OTHER PUBLICATIONS

"Digital Image Processing" by Rafael C. Gonzales and Richard E. Woods, pp. 166–242, published in 1992.

*Primary Examiner*—Andrew Johns
*Attorney, Agent, or Firm*—Koda and Androlia

[57] ABSTRACT

An X-ray image displaying apparatus including a CPU, a video memory for storing image data, palette registers to which conducts the gradient conversion on image data stored in the video memory, DA converters for converting image data output from the palette registers into a color video signal, a monitoring device for receiving the color video signal and color-displaying an X-ray image, and a video printer for displaying the image on a recording medium. An interested region width setting switch and an interested region position setting switch are connected to a keyboard. The gradient characteristics of the palette registers are set to be $\gamma > 1$ in an interested region, and to be $\gamma = 1$ in an uninterested region.

8 Claims, 10 Drawing Sheets

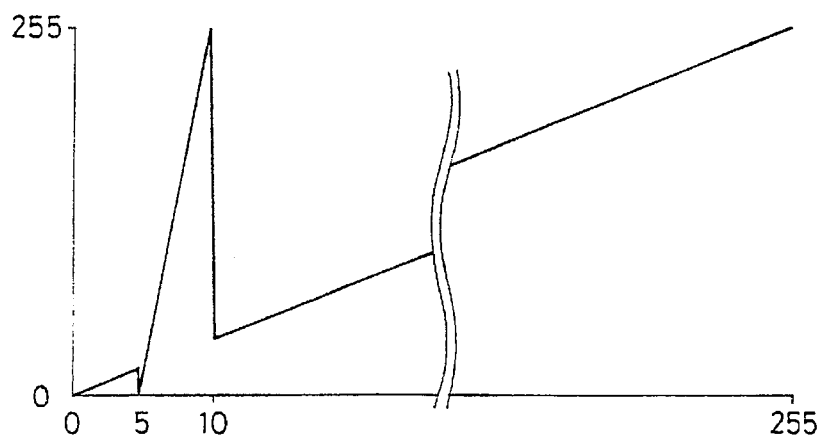

METHOD AND APPARATUS FOR DIGITALLY DISPLAYING AN ENHANCED X-RAY IMAGE

BACKGROUND OF THE INVENTION

1. Field of the Invention

The present invention relates to a method and apparatus for displaying an X-ray image which detect in the form of an electric signal an X-ray image relating to an intraoral region or the like of a subject so that the X-ray image is displayed on a CRT (cathode ray tube) or the like.

2. Description of the Related Art

Conventionally, in order to obtain an X-ray image of an intraoral region, a film method is widely employed in which a photosensitive recording material such as a silver film is exposed to an X-ray followed by developing and fixing processes.

However, the film method has problems in that: 1) a time period of about 2 minutes or longer must be required between the X-ray exposure and the observation of the X-ray image; 2) a developing apparatus and processing solutions for conducting the developing and fixing processes are indispensable; 3) the X-ray sensitivity of a silver salt has a limitation; therefore, an X-ray dose of a predetermined level is required to obtain a desired image density; and 4) it is impossible to correct an image which has been once fixed.

In order to solve these problems, an X-ray imaging apparatus is proposed in which an X-ray image is converted into an electric signal by using an imaging device such as a CCD (charge coupled device) and the X-ray image is then displayed on a CRT (cathode ray tube) or the like. The X-ray imaging apparatus employs a so-called non-film which does not use a photosensitive recording material such as a silver film, and has features in that: 1) an X-ray image can be observed in real time after the exposure of X-rays; 2) a developing apparatus and processing solutions are entirely unnecessary; 3) the X-ray sensitivity characteristic of an imaging device is linear and therefore, an X-ray dose can be reduced; and 4) a detected X-ray image can be subjected to various image processings, as well as can be easily copied or stored.

In contrast to an X-ray photograph based on a silver film having a density range of 0 to 4, an apparatus for displaying a digital image, such as a CRT or a thermal printer has a low density range of 0 to 2. With respect to a density gradient, furthermore, 64 gradients can be distinguished at the maximum by the naked eye.

Since a silver film is subjected to observation of the transmitted light due to the silver grain masking, it is excellent in brightness contrast. In contrast, a CRT operates on the basis of the visible-light conversion of a fluorescent material impinged by an electron beam, and therefore, a CRT is low in brightness, and has an inferior dynamic range. A thermal printer which utilizes a black degree appearing on thermosensitive papers is subjected to the reflection light observation, and hence, it is not excellent in brightness contrast and gradient resolution. Consequently, radiologists and doctors who are familiar with diagnosis based on an image formed on a silver film show a tendency to evaluate that a CRT and a thermal printer are inferior in the amount of information provided.

In order to solve the lack of information, it is proposed that an X-ray image is represented by a digital signal of 8 bits (256 levels) or 12 bits (1,024 levels), and is subjected to various kinds of image processing such as the gradient conversion, the integration image, the shading correction, the difference input, the edge enhancement, the addition input, the convolute processing, the filtering, and the inter-image operation, thereby improving the diagnosis ability.

In a medical diagnosis, the gradient conversion is particularly important. However, the gradient conversion has a problem in that, when the gradient emphasis is linearly conducted on a specific density region, the region may be converted into an image which is easy to see but densities of other regions jump to an extreme level, or the entirely black level or the entirely white level, whereby it is made difficult to diagnose the whole region. Alternatively, a multi-stage emphasizing technique may be employed in which the whole density range is divided into plural subregions and the gradient emphasis is conducted discontinuously on the subregions. According to this technique, the density can be prevented from jumping to the entirely black level or the entirely white level, but equidensity lines appear in an image in a manner similar to contour lines used in a map. This causes the diagnosis to be very difficult to conduct.

SUMMARY OF THE INVENTION

It is an object of the invention to provide a method and apparatus for displaying an X-ray image in which the gradient of an interested image region is emphasized so as to improve the diagnosis ability and the diagnosis ability for the whole image is prevented from being impaired so as to facilitate the diagnosis based on an image.

According to the invention, there is provided a method for displaying an X-ray image in which X-ray image data consisting of digital values are subjected to a gradient conversion and then displayed on a screen or a recording medium, characterized in that when a ratio of an increment of output data of gradient characteristics to an increment of input data is indicated by $\gamma$, the conversion is conducted with the gradient characteristics of $\gamma>1$ in the case where input data values are in an interested region of a predetermined range, and the conversion is conducted with the gradient characteristics of $\gamma=1$ in the case where input data values are in an uninterested region outside the predetermined range.

Furthermore, the invention is characterized in that an image is displayed while changing the width of the interested region.

Furthermore, the invention is characterized in that an image is displayed while changing the position of the interested region.

Furthermore, the invention is characterized in that the gradient conversion is conducted on both the density gradient and the chromaticity gradient, and the density gradient characteristics and the chromaticity gradient characteristics in the interested region are different from the density gradient characteristics and the chromaticity gradient characteristics in the uninterested region.

According to the invention, there is provided an apparatus for displaying an X-ray image which comprises:

means for storing X-ray image data consisting of digital values;

means for conducting a gradient conversion on the X-ray image data on the basis of predetermined gradient characteristics; and means for displaying the X-ray image data on which gradient conversion has been conducted, on a screen or a recording medium, characterized in that when a ratio of an increment of output data of a table of gradient characteristics to an increment of input data is indicated by γ, the gradient converting means conducts conversion with the gradient characteristics of γ>1 in the case where input data values are in an interested region of a predetermined range, and with the gradient characteristics of γ=1 in the case where input data values are in an uninterested region outside the predetermined range.

Furthermore, the invention is characterized in that the apparatus further comprises means for setting the width of an interested region.

Furthermore, the invention is characterized in that the apparatus further comprises means for setting the position of an interested region.

Furthermore, the invention is characterized in that the gradient converting means conducts both the density gradient conversion and the chromaticity gradient conversion, and the density gradient characteristics and the chromaticity gradient characteristics in the interested region are different from the density gradient characteristics and the chromaticity gradient characteristics in the uninterested region.

According to the method of the invention, when input data values are in an interested region of a predetermined range, conversion is conducted with gradient characteristics of γ>1 wherein the characteristic curve has a steep gradient, whereby the gradient of the interested region is emphasized so that the diagnosis ability of the region is improved. In contrast, when input data values are in an uninterested region outside the predetermined range, conversion is conducted by gradient characteristics of γ=1 wherein the gradient emphasis is not performed, and the resulting image has a normal gradient. Consequently, an image of a portion which is to be diagnosed is made easy to see by the gradient emphasis, and also images of surrounding portions can be observed simultaneously. Therefore, it is easy to detect a varied site such as a lesion. Furthermore, the peripheral state and position of the varied site can easily be ascertained.

Since an image is displayed while changing the width of the interested region, the density jump in the boundary of the interested region is displayed on a screen while being continuously changed. Therefore, it is easy to identify the size and position of the interested region. Furthermore, gradient characteristics of the interested region are continuously changed from a steep state to a gentle state or vice versa. Therefore, the relationship between an image with gradient emphasis and that without gradient emphasis becomes clear.

Since an image is displayed while changing the position of the interested region, the density jump in the boundary of the interested region is displayed on a screen while being continuously changed. Therefore, it is easy to identify the size and position of the interested region. Furthermore, since the region wherein the gradient emphasis is performed moves continuously, the dynamic range of an image of a high gradient resolution is apparently widened so that the diagnosis ability is improved.

Since the gradient conversion is conducted on both the density gradient and the chromaticity gradient, an X-ray image which is originally a monochrome image is displayed while coloring the gradient levels with different colors. Therefore, even a minute change in signal level can be observed distinctly. Since density gradient characteristics and chromaticity gradient characteristics in an interested region are different from those in an uninterested region, the color tone of the interested region is differentiated from that of the uninterested region so that the size and position of the interested region are easily identified.

According to the apparatus of the invention, when input data values are in an interested region of a predetermined range, conversion is conducted with gradient characteristics of γ>1 wherein the characteristic curve has a steep gradient, whereby the gradient of the interested region is emphasized so that the diagnosis ability of the region is improved. In contrast, when input data values are in an uninterested region outside the predetermined range, conversion is conducted by gradient characteristics of γ=1 wherein the gradient emphasis is not performed, and the resulting image has a normal gradient. Consequently, an image of a site which is to be diagnosed is made easy to see by the gradient emphasis, and also images of surrounding portions can be observed simultaneously. Therefore, it is easy to detect a varied site such as a lesion. Furthermore, the peripheral state and position of the varied site can easily be ascertained.

Since the interested region width setting means for setting the width of an interested region is disposed, an image can be displayed while changing the width of the interested region, so that the density jump in the boundary of the interested region is displayed on a screen while being continuously changed. Therefore, it is easy to identify the size and position of the interested region. Furthermore, gradient characteristics of the interested region are continuously changed from a steep state to a gentle state or vice versa. Therefore, the relationship between an image with gradient emphasis and that without gradient emphasis becomes clear.

Since the interested region position setting means for setting the position of an interested region is disposed, an image can be displayed while changing the position of the interested region, so that the density jump in the boundary of the interested region is displayed on a screen while being continuously changed. Therefore, it is easy to identify the size and position of the interested region. Furthermore, since the region wherein the gradient emphasis is performed moves continuously, the dynamic range of an image of a high gradient resolution is apparently widened so that the diagnosis ability is improved.

Since the gradient converting means such as a conversion table conducts both the density gradient conversion and the chromaticity gradient conversion, an X-ray image which is originally a monochrome image is displayed while coloring the gradient levels with different colors. Therefore, even a minute change in signal level can be observed distinctly. Since the density gradient characteristics and the chromaticity gradient characteristics in an interested region are different from those in an uninterested region, the color tone of the interested region is differentiated from that of the uninterested region so that the size and position of the interested region are easily identified.

As described above in detail, according to the invention, an image of a site which is to be diagnosed is made easy to see by the gradient emphasis, and also images of surrounding portions can be observed simultaneously. Therefore, it is easy to detect a varied site such as a lesion. Furthermore, the peripheral state and position of the varied site can easily be ascertained.

An image is displayed while changing the width of the interested region. Therefore, it is easy to identify the size and position of the interested region. Furthermore, an image is displayed while changing the position of the interested region. Therefore, it is easy to identify the size and position of the interested region. Consequently, the diagnosis ability based on an image is improved.

An X-ray image which is originally a monochrome image is displayed while coloring the gradient levels with different colors. Therefore, even a minute change in signal level can be observed distinctly. Furthermore, the color tone of the interested region is differentiated from that of the uninterested region, and hence the size and position of the interested region are easily identified.

In this way, according to the invention, a density dynamic range which can be compared with that of a silver film can be obtained, and an image can be displayed by normal gradient as a whole. Therefore, doctors or radiologists who are familiar with an image formed on a film can resilver film can read the image for diagnostic purpose without feeling a sense of incongruity. Moreover, an image of a high density resolution can be displayed even on a CRT or a hard copy which has a dynamic range narrower than that of a silver film. Since even a patient who is inexperienced in analyzing an X-ray image can clearly recognize a symptom of a disease site, thereby assisting the doctor and the patient in understanding the disease condition.

BRIEF DESCRIPTION OF THE DRAWINGS

Other and further objects, features, and advantages of the invention will be more explicit from the following detailed description taken with reference to the drawings wherein:

FIG. 8(a) shows an example of a gradient characteristic curve, and FIG. 8(b) shows a numerical table for FIG. 8(a);

DETAILED DESCRIPTION OF THE PREFERRED EMBODIMENTS

Figure 1:
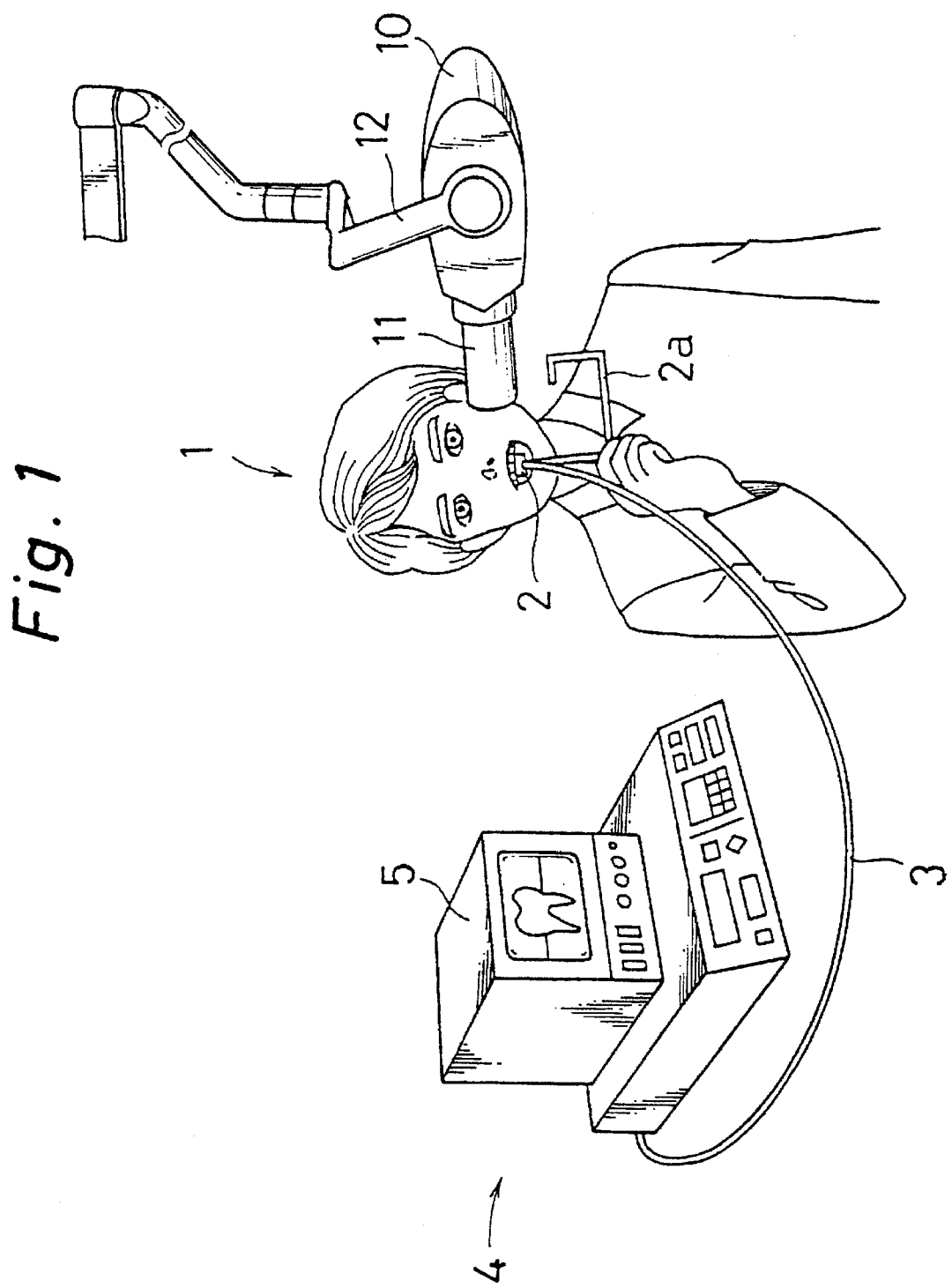
FIG. 1 is a diagram showing a state of using an X-ray imaging apparatus according to the invention.

Now referring to the drawings, preferred embodiments of the invention are described below.

FIG. 1 is a diagram showing a state of using an X-ray imaging apparatus according to the invention in the case where the subject is an intraoral region. An X-ray generator 10 is attached to a universal arm 12 in such manner that it is vertically swingable and horizontally rotatable with respect to the universal arm. The direction of an X-ray irradiation tube 11 can be adjusted so that X-rays are irradiated to the intraoral region of a patient 1.

On the other hand, an imaging device 2 which detects the distribution of X-rays passed through the intraoral region (i.e., an X-ray image) is located at a position which opposes the X-ray irradiation tube 11 with the intraoral region between them. In FIG. 1, the patient holds by means of fingers a positioning member 2a fixed to the imaging device 2, so that the imaging face of the imaging device 2 is directed to the X-ray irradiation direction.

The imaging device 2 comprises: a scintillator plate which converts X-ray photons into, for example, visible light, and which is made of a rear earth compound, etc.; an optical fiber array which transmits the two-dimensional distribution of the visible light radiated from the scintillator plate, as it is generated; and a CCD array sensor which receives the visible light distribution transmitted through the optical fiber array to generate charges, which accumulates the generated charges, and from which charges accumulated for a predetermined period are sequentially read out to be converted into an electric signal. A lead plate for preventing scattered X-rays from entering is disposed on the back face of the CCD array sensor. These components are disposed in a housing which is made of a synthetic resin or the like. An X-ray image detected by the imaging device 2 is converted into an electric signal by the CCD array sensor, and then supplied to an X-ray image displaying apparatus 4 through a signal cable 3.

The X-ray image displaying apparatus 4 digitizes a signal from the imaging device 2, stores the digital data in a memory, and then conducts a predetermined image processing on the digital data so that an image can be displayed on a monitoring device 5 such as a CRT (cathode ray tube) or printed on a recording sheet as a hard copy.

Figure 2:
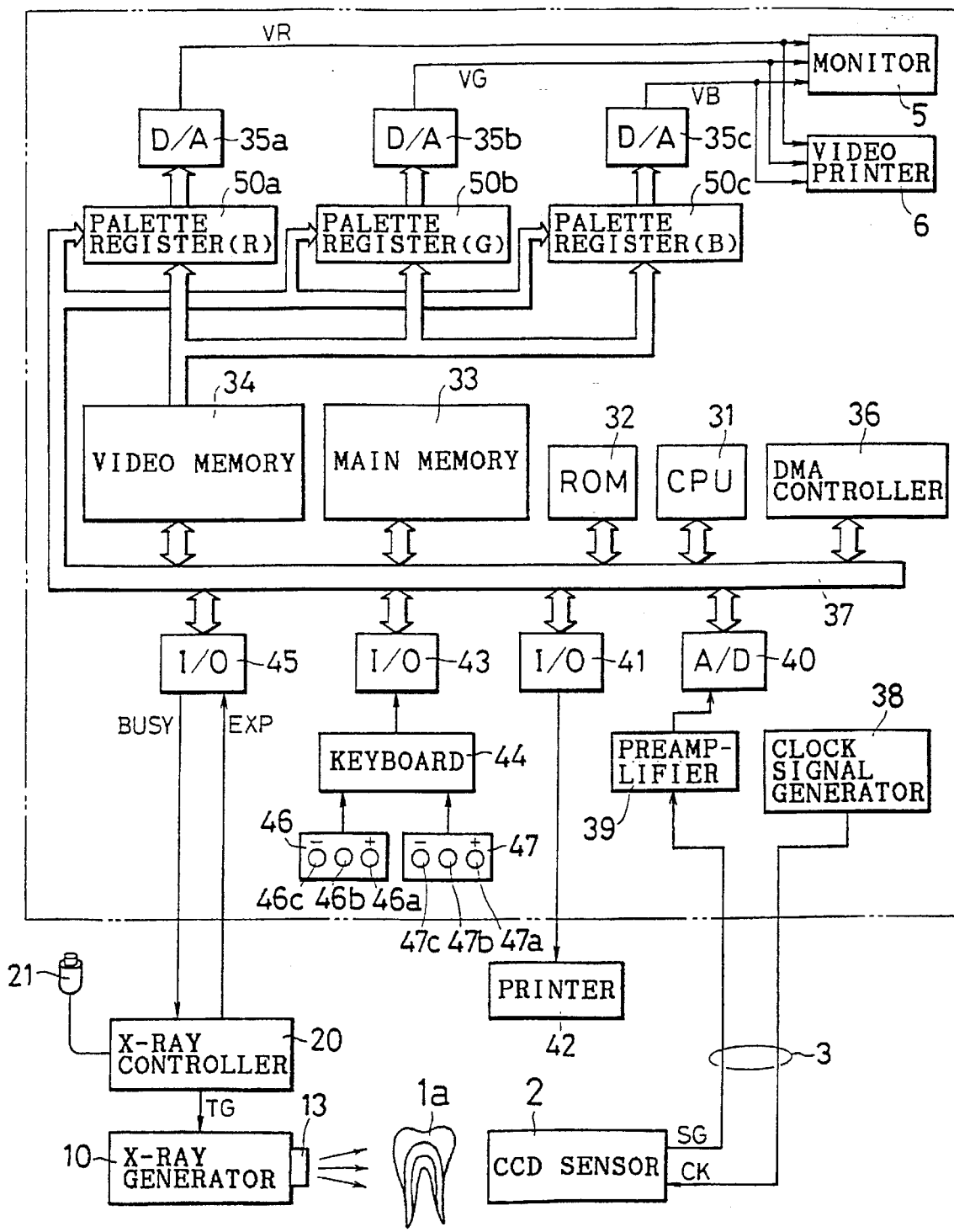
FIG. 2 is a block diagram showing the electrical configuration of an X-ray image displaying apparatus 4 which is a first embodiment of the invention.

FIG. 2 is a block diagram showing the configuration of the X-ray image displaying apparatus 4 which is a first embodiment of the invention. The X-ray imaging apparatus shown in FIG. 1 comprises an X-ray generator 10 for irradiating X-rays to a subject 1a such as a tooth, an X-ray controller 20 for controlling the operation of the X-ray generator 10, the imaging device 2 for detecting an X-ray image of the subject 1a, and the X-ray image displaying apparatus 4 which reads the X-ray image detected by the imaging device 2 and conducts a predetermined image processing to display an X-ray image.

The X-ray image displaying apparatus 4 comprises: a CPU (central processing unit) 31 for controlling the whole operation; a ROM (random access memory) 32 for storing programs and data required for the operation of the CPU 31; a main memory 33 for storing image data, parameters required for calculations such as the image processing, and the like; a video memory 34 for storing image data which are to be displayed on the monitoring device 5; palette registers 50a to 50c which conduct the gradient conversion on image data stored in the video memory 34 on the basis of predetermined gradient characteristics; DA converters 35a to 35c for converting image data output from the palette registers 50a to 50c into color video signals VR, VG, and VB; the monitoring device 5 for receiving the color video signals VR, VG, and VB output from the DA converters 35a to 35c, and for displaying a color X-ray image on a CRT screen and a video printer 6 for displaying a color X-ray image on a recording medium; and a DMA (direct memory access) controller 36 for controlling data transfer between circuits with no intervention from the CPU 31. The X-ray image displaying apparatus 4 further comprises: a clock signal generator 38 for generating a clock signal CK required for the operation of the imaging device 2 such as a CCD sensor; a preamplifier 39 for receiving an image signal SG output from the imaging device 2 and amplifying the signal; an AD converter 40 for converting the analog signal output from the preamplifier 39 into a digital signal; an input/output circuit 41 for supplying data to an external printer 42; an input/output circuit 43 for receiving data from a keyboard 44 for data entry; an input/output circuit 45 for generating a busy signal BUSY to the external X-ray controller 20, and for receiving an exposure signal EXP from the X-ray controller 20; and a bus 37 for interconnecting these circuits.

An interested region width setting switch 46 for setting the width of an interested region, and an interested region position setting switch 47 for setting the position of the interested region are connected to the keyboard 44.

The palette registers 50a to 50c conduct separate gradient conversion processes for the three primary colors, red (R), green (G) and blue (B) on an X-ray image which is originally a monochrome image, thereby realizing a pseudo color display. The gradient characteristics of the registers can be rewritten by the CPU 31.

In the imaging device 2, charges accumulated for a predetermined period are periodically read out as a dark current on the basis of the clock signal CK from the clock signal generator 38, and excess charges due to thermal excitation and scattered X-rays are maintained so as not to remaining in the device.

The X-ray controller 20 outputs a trigger signal TG to the X-ray generator 10 in accordance with directions from an exposure switch 21, and further outputs an exposure signal EXP indicative of the generation of X-rays to the X-ray image displaying apparatus 4. In response to the trigger signal TG, the X-ray generator 10 applies a high voltage to an X-ray tube 13 under predetermined X-ray exposure conditions including the tube voltage, the tube current, and the exposure period, thereby generating X-rays.

Next, the X-ray imaging operation will be described. When the exposure switch 21 of the X-ray controller 20 is pressed, the X-ray generator 10 generates X-rays for a predetermined period. When the X-rays pass through the subject 1a and reach the imaging device 2, charges corresponding to the X-ray image impinged on the imaging device 2 are accumulated. After the X-ray exposure has ended, the charges are output in time series as the image signal SG. The image signal SG from the imaging device 2 is supplied to the preamplifier 39 to be amplified to a given level, and then supplied to the AD converter 40 in the next stage to be converted into digital data. At this time, the DMA controller 36 occupies the bus 37, and image data output from the AD converter 40 are sequentially stored in a part of the main memory 33 through the bus 37.

On the other hand, also when the X-ray exposure is not conducted, the dark current of the imaging device 2 is periodically read out, and then converted into digital data by the AD converter 40. The digital data are stored as dark current data in a part of the main memory 33.

The image data and dark current data stored in the main memory 33 are processed by the CPU 31. For example, the dark current data are subtracted from the image data, and the resulting image data are again stored in a part of the main memory 33. This eliminates background noises from the image data so that image data of a high quality are obtained. In the case where dark current noises are negligible, the subtraction process may be omitted so that the whole processing period is shortened.

The image data stored in the main memory 33 are transferred to the video memory 34 by the DMA controller 36. The image data stored in the video memory 34 are subjected to separate gradient conversion processes for the three primary colors by the palette registers 50a to 50c, and then output to the DA converters 35a to 35c. The DA converter 35a converts the digital image data into the red video signal VR, the DA converter 35b converts the digital image data into the green video signal VG, and the DA converter 35c converts the digital image data into the blue video signal VB. The video signals are output to the monitoring device 5 and the video printer 6. In this way, the X-ray image detected by the imaging device 2 is color-displayed on a screen of the monitoring device 5, or printed by the video printer 6 to obtain a hard copy. As required, the video signals VR, VG and VB may be recorded by a recording apparatus such as a video tape recorder.

Figure 3:
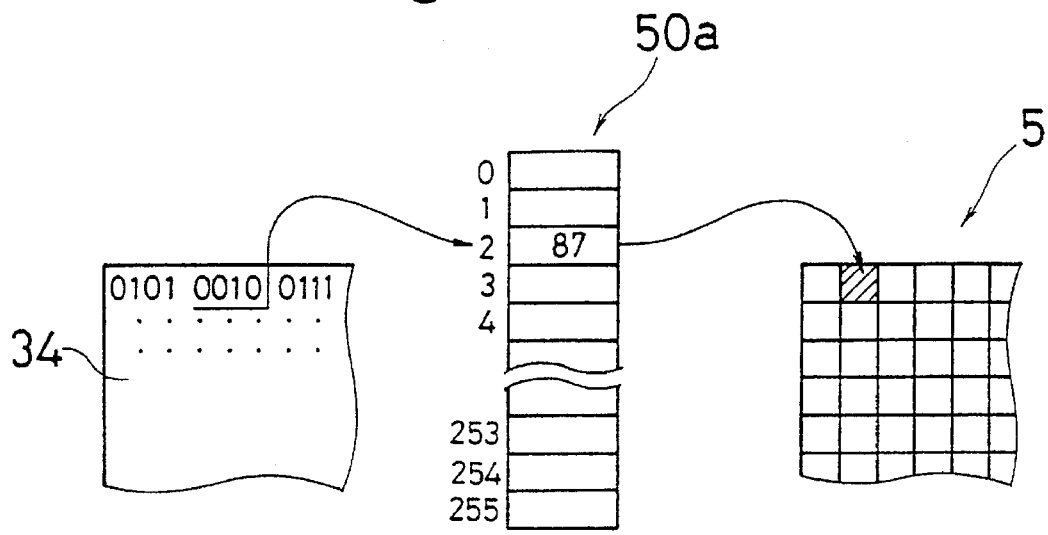
FIG. 3 is a diagram showing the operation of the gradient conversion according to palette registers 50a to 50c.

FIG. 3 is a diagram showing the operation of the gradient conversion according to the palette registers 50a to 50c. The video memory 34 stores digitized X-ray image data in a matrix form. When pixel data stored in the first row and the second column is 0010B (where "B" affixed to the numerals indicates the binary notation), for example, data stored at address 2 of the palette register 50a is referred. When the stored data is 87D (where "D" affixed to the numerals indicates the decimal notation), the pixel in the first row and the second column of the screen of the monitoring device 5 is displayed as red with a brightness level of 87. Similarly, also in the green palette register 50b and the blue palette register 50c, data stored at address 2 are referred. When the values of both the data are 87D, the pixel in the first row and the second column is displayed as green and blue with a brightness level of 87, resulting in that red, green and blue have the same brightness level so as to enable the monochrome display.

Figures 4A, 4B, 4C:
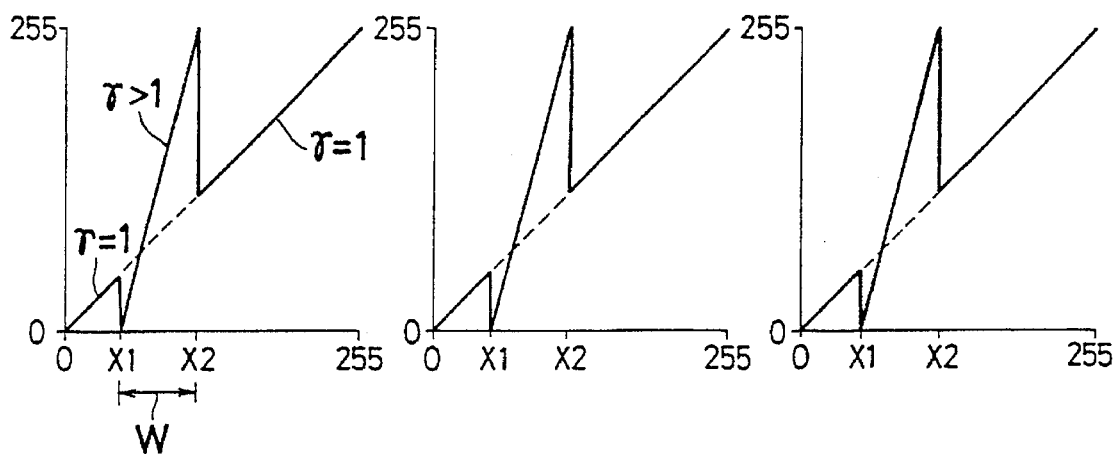
FIG. 4(a) is a graph showing an example of a gradient characteristic curve of the palette register 50a, FIG. 4(b) is a graph showing an example of a gradient characteristic curve of the palette register 50b.
FIG. 4(c) is a graph showing an example of a gradient characteristic curve of the palette register 50c.

FIG. 4(a) is a graph showing an example of a gradient characteristic curve of the palette register 50a, FIG. 4(b) is a graph showing an example of a gradient characteristic curve of the palette register 50b, and FIG. 4(c) is a graph showing an example of a gradient characteristic curve of the palette register 50c.

In the case where each image data for one pixel consists of 8 bits, input data changes in the range of 0 to 255, and also output data changes in the range of 0 to 255. The boundaries of the interested region are preset to be X1 and X2, and the width of the interested region is preset to be W. When a ratio of an increment of output data to an increment of input data, i.e., the gradient of the curve is indicated by γ, a line which passes the origin (0, 0) and has γ=1 is set in the input data range of 0 to X1−1, a line which passes coordinates (X1, 0) and (X2, 255) and has γ>1 is set in the input data range of X1 to X2, and a line which passes the origin (0, 0) and has γ=1 is set in the input data range of X2+1 to 25S. Particularly, FIG. 4 shows an example where the same gradient characteristic curve is set in all the red, green and blue palette registers 50a, 50b and 50c. In the example, the monochrome display where red, green and blue have the same brightness level is realized.

As seen from the above, when input data in the interested region, the conversion is conducted with gradient characteristics of γ>1 so that the gradient of the interested region is emphasized. In contrast, when input data is in the uninterested region, the conversion is conducted with gradient characteristics of γ=1 so that an image having a normal gradient is obtained. Therefore, an image of a site which is to be diagnosed is made easy to see by the gradient emphasis, and also images of surrounding sites can be observed simultaneously, resulting in that the diagnosis ability for the whole image is improved.

In a dental X-ray imaging process in which an image of teeth, etc. is to be taken, particularly, when inflammation in the vicinity of the alveolar bone is subjected to the gradient emphasis, it becomes easy to see, and peripheral sites such as a root are displayed with a normal gradient. This allows the relative positional relationship between the inflammatory site and the root to be correctly observed. Accordingly, the gradient characteristics of the invention are very suitable for an image processing of a dental X-ray image.

The width and position of an interested region are set through the interested region width setting switch 46 and the interested region position setting switch 47 which are connected to the keyboard 44.

Assuming that the characteristic curves of FIG. 4 are currently set, when the switch 46a is pressed one time, the CFU 31 causes the boundary value X1 or X2 to be moved leftward or rightward so that the interested region width is changed to W+1, and at the same time rewrites the gradient characteristic curves. When the switch 46a is pressed n times (n is a natural number), the interested region width is changed to W+n, and the gradient characteristic curves are rewritten.

When the switch 46c is pressed one time, the CFU 31 causes the boundary value X1 or X2 to be moved rightward or leftward so that the width of the interested region is changed to W−1, and at the same time rewrites the gradient characteristic curves. When the switch 46b is pressed, the interested region width W is initial or set to be the initial value of, for example, 128.

When the switch 47a is pressed one time, the CPU 31 causes the boundary values X1 and X2 to be moved rightward by one place, and at the same time rewrites the gradient characteristic curves. When the switch 47a is pressed n times, the boundary values of the interested region are respectively changed to X1+n and X2+n, and the gradient characteristic curves are rewritten.

Figure 5:
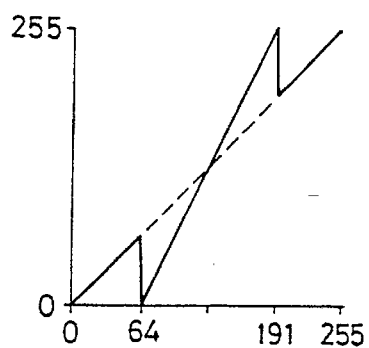
FIG. 5 is a graph showing an initialization characteristic curve.

When the switch 47c is pressed one time, the CPU 31 causes the boundary values X1 and X2 to be moved leftward by one place, and at the same time rewrites the gradient characteristic curves. When the switch 47b is pressed, the boundary values X1 and X2 of the interested region are initialized, or set to be the initial values of, for example, 64 and 191, respectively. When the switches 46b and 47b are simultaneously pressed, therefore, the initialized characteristic curve shown in FIG. 5 is set.

As described above, since the interested region width setting switch 46 is operated so as to display an image while changing the width of the interested region, it is easy to identify the size and position of the interested region, thereby improving the diagnosis ability based on an image. Similarly, when the interested region position setting switch 47 is operated so as to display an image while changing the position of the interested region, it is easy to identify the size and position of the interested region, thereby improving the diagnosis ability based on an image.

Figures 6A, 6B, 6C:
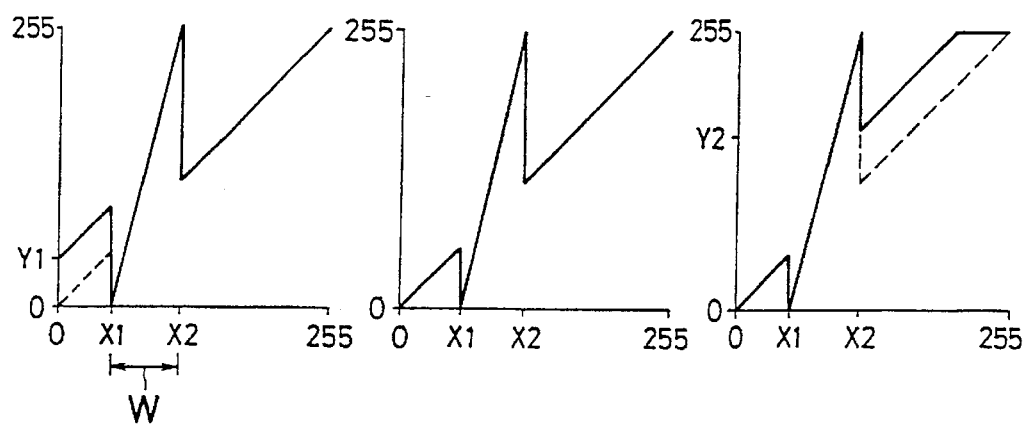
FIG. 6(a) is a graph showing another example of a gradient characteristic curve of the palette register 50a, FIG. 6(b) is a graph showing another example of a gradient characteristic curve of the palette register 50b.
FIG. 6(c) is a graph showing another example of a gradient characteristic curve of the palette register 50c.

FIG. 6(a) is a graph showing another example of a gradient characteristic curve of the palette register 50a, FIG. 6(b) is a graph showing another example of a gradient characteristic curve of the palette register 50b, and FIG. 6(c) is a graph showing another example of a gradient characteristic curve of the palette register 50c.

In the same manner as FIG. 4, the boundaries of the interested region are preset to be X1 and X2, and the width of the interested region is preset to be W. When compared with the curves of FIG. 4, the curves of the interested region are the same, but the curves of the uninterested region are different. Specifically, in FIG. 6(a), a line which passes coordinates (0, Y1) and has γ=1 is set in the input data range of 0 to X1−1, and, in FIG. 6(c), a line which passes coordinates (X2, Y2) and has γ=1 is set in the input data range from X2+1 to 255 and the maximum value is restricted to 255.

When such gradient characteristic curves are set, a monochrome image wherein the gradient is emphasized in the interested region is displayed, an image where the red brightness level is emphasized as compared with the other colors so that the image is tinged with red is displayed in the lower uninterested region of 0 to X1−1, and an image where the blue brightness level is emphasized as compared with the other colors so that the image is tinged with blue is displayed in the upper uninterested region of X2+1 to 255. Since the color tone of the interested region is differentiated from that of the uninterested region as described above, the size and position of the interested region are easily identified.

In the above, examples where the gradient characteristic curves of the palette registers 50a to 50c are identical with or similar to each other have been described. Alternatively, the palette registers 50a to 50c may be set to have different gradient characteristic curves. In the alternative, an X-ray image which is originally a monochrome image can be displayed while coloring the gradient levels with different colors. Therefore, even a minute change in signal level can be observed distinctly.

Figure 7:
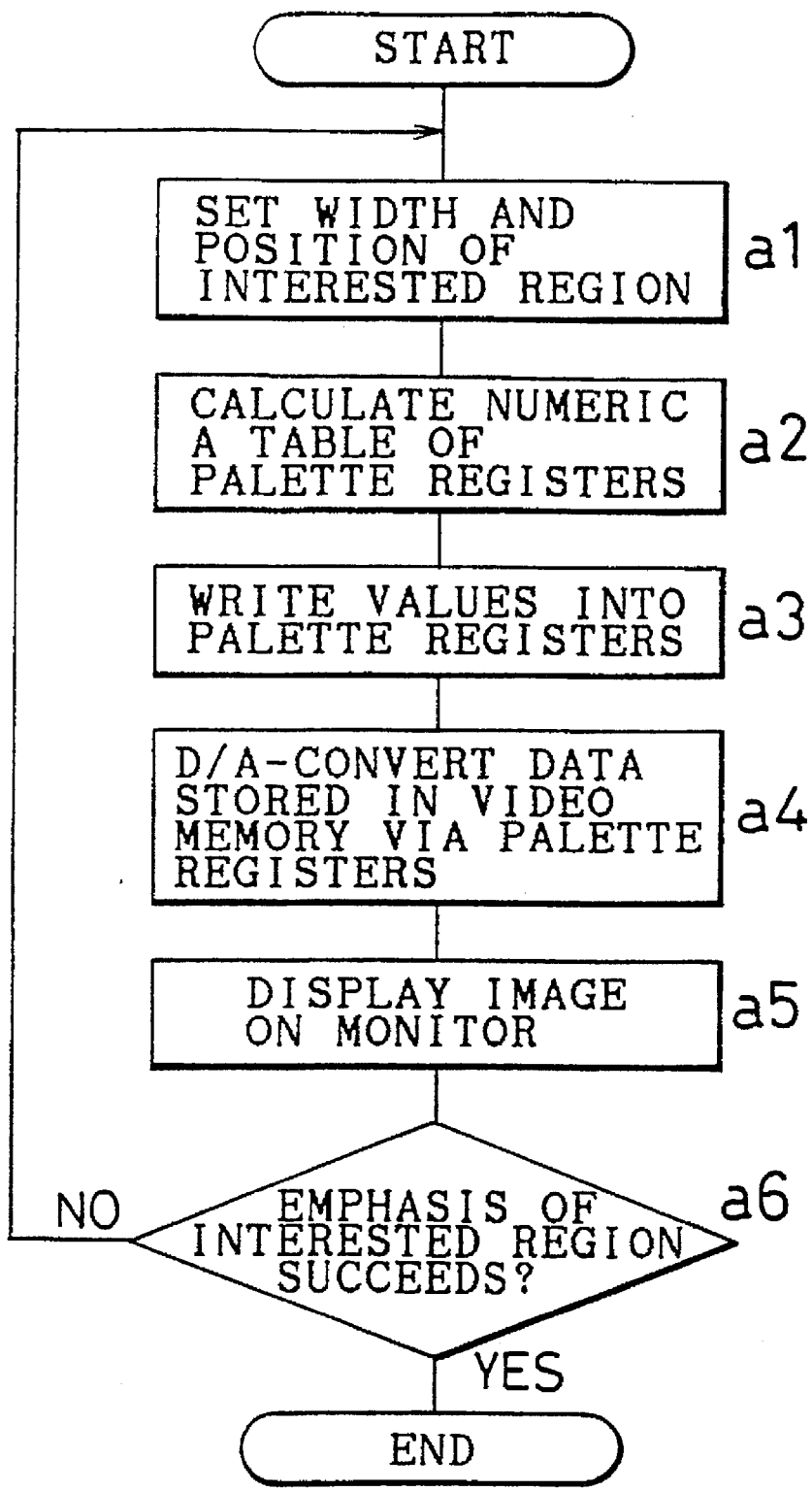
FIG. 7 is a flowchart showing the X-ray image displaying operation in the X-ray image displaying apparatus 4 of FIG. 2.

FIG. 7 is a flowchart showing the X-ray image displaying operation in the X-ray image displaying apparatus 4 of FIG. 2. First, in step a1, the interested region width setting switch 46 and the interested region position setting switch 47 which are connected to the keyboard 44 are operated to set the width and position of an interested region. The CPU 31 calculates in step a2 the numeric tables of the palette registers 50a to 50c.

FIG. 8(a) shows an example of a gradient characteristic curve, and FIG. 8(b) shows a numerical table for FIG. 8(a). The boundary values of the interested region are set to be 5 and 10, and, in this range, output data changes from 0 to 255. The gradient y of the curve is 256/6≈4.2. The gradient γ of each of the uninterested regions in the ranges of 0 to 4 and 11 to 255 is 1. Therefore, the correspondence of addresses to data in the numerical table of FIG. 8(b) is as follows: 0→0, 1→1, . . . , 4→4, 5→0, 6→51, 7→102, 8→153, 9→204, 10→255, 11→11, 12→12, . . . , 255→255.

Referring again to FIG. 7, the numerical table which has been calculated as described above is written in step a3 into the palette registers 50a to 50c. In step a4, the X-ray image data stored in the video memory 34 are input to the palette registers 50a to 50c to be converted to the predetermined gradient, and then converted into the color video signals VR, VG and VB by the DA converters 35a to 35c. In step a5, the X-ray image on which the gradient conversion has been conducted is displayed by the monitoring device 5 or the video printer 6, to be used in the diagnosis. It is judged in step a6 whether or not the gradient emphasis has been conducted successfully or the X-ray image has been converted into an image easy to see. If it is judged that the emphasis has been conducted successfully, the process is terminated. If it is judged that the emphasis has not been conducted successfully, the process returns to step a1 to conduct again the setting of the width and position of the interested region, and the image display.

Figures 9A, 9B:
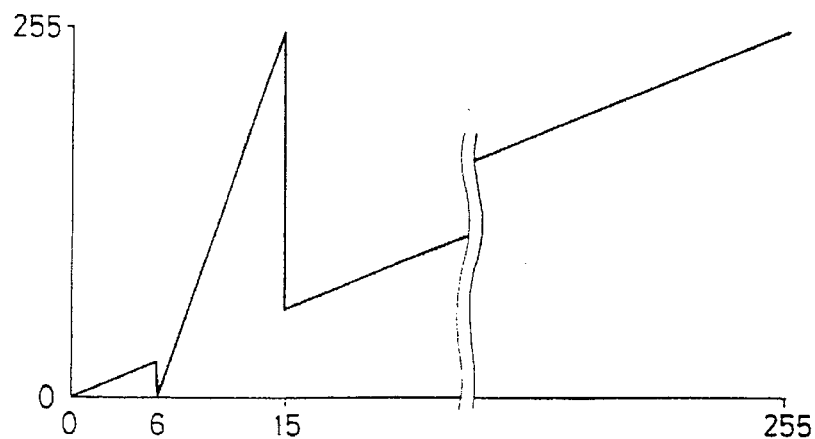
FIG. 9(a) shows another example of a gradient characteristic curve.
FIG. 9(b) shows a numerical table for FIG. 9(a)

FIG. 9(a) shows another example of a gradient characteristic curve, and FIG. 9(b) shows a numerical table for FIG. 9(a). As compared with FIG. 8, the width of the interested region is slightly increased, and the position of the region is moved slightly upward. The boundary values of the interested region are set to be 6 and 15. The gradient $\gamma$ of the curve of the interested region is 256/10≈2.6. In other words, the gradient emphasis is slightly reduced in degree. The gradient $\gamma$ of each of the uninterested regions in the ranges of 0 to 5 and 16 to 255 is 1. Therefore, the correspondence of addresses to data in the numerical table of FIG. 9(b) is as follows: 0→0, 1→1, ..., 5→5, 6→0, 7→28, 8→57, 9→85, ..., 13→198, 14→226, 15→255, 16→16, 17→17, ..., 255→255.

When an image is displayed while changing the width of the interested region as described above, it is easy to identify the size and position of the interested region, thereby improving the diagnosis ability based on an image.

Figure 10:
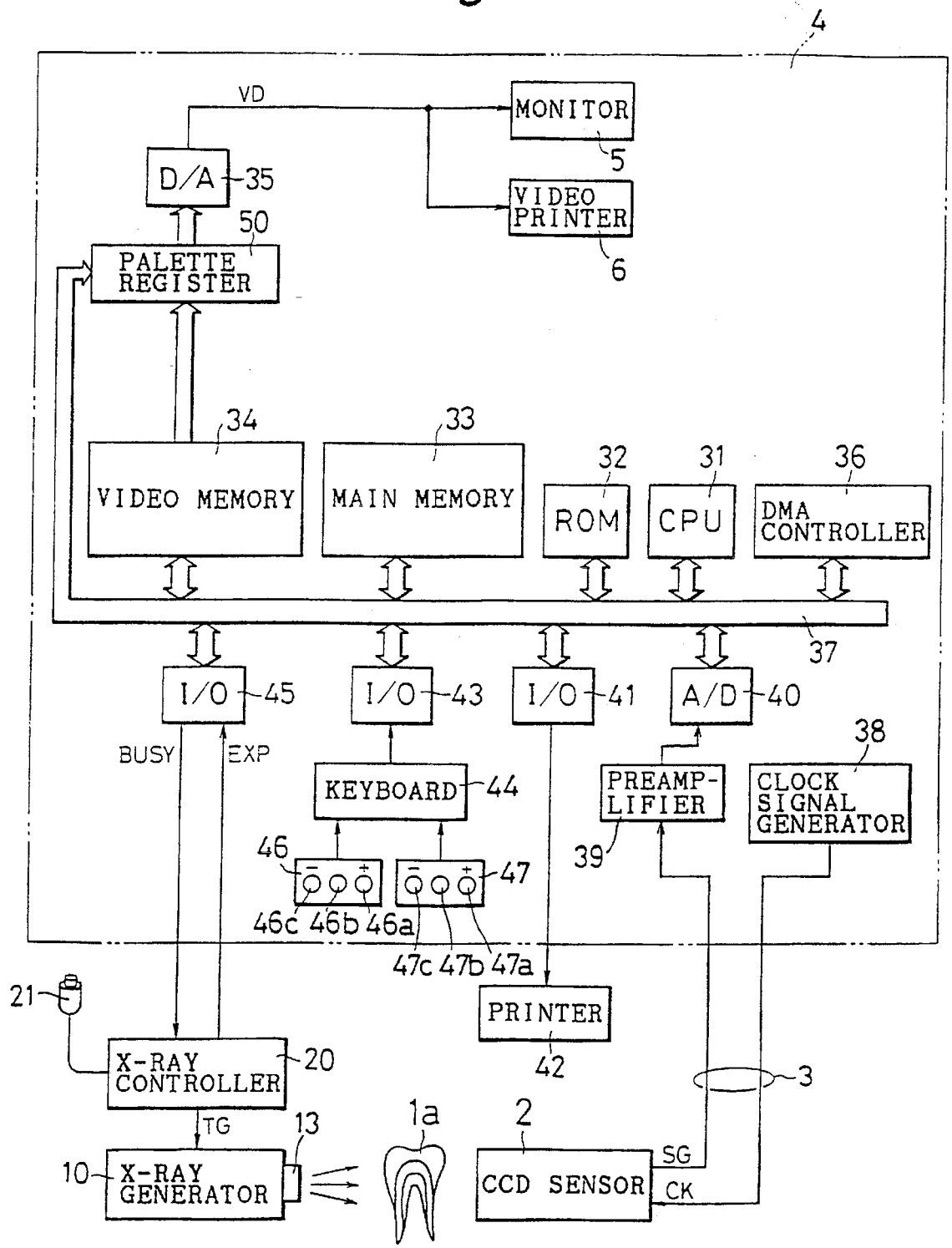
FIG. 10 is a block diagram showing the electrical configuration of an X-ray image displaying apparatus 4 which is a second embodiment of the invention.

FIG. 10 is a block diagram showing the electrical configuration of the X-ray image displaying apparatus 4 which is a second embodiment of the invention. The X-ray image displaying apparatus 4 of the embodiment is configured in a similar manner as that of FIG. 2 except that only one palette register 50 for monochrome display, and one DA converter 35 are disposed.

The X-ray image displaying apparatus 4 comprises: the CPU 31; the ROM 32 for storing programs and data; the main memory 33 for storing data and the like; the video memory 34; the palette register 50 which conducts the gradient conversion on image data stored in the video memory 34 on the basis of predetermined gradient characteristics; the DA converter 35 for converting image data output from the palette register 50 into an analog video signal VD; and the monitoring device 5 for receiving the video signal VD output from the DA converter 35, and for displaying an X-ray image on the CRT screen and the video printer 6 for displaying an X-ray image on the recording medium.

In the same manner as FIG. 2, the interested region width setting switch 46 for setting the width of an interested region, and the interested region position setting switch 47 for setting the position of the interested region are connected to the keyboard 44.

The palette register 50 conducts a gradient conversion process on X-ray image data to realize the gradient emphasis. The gradient characteristics can be rewritten by the CPU 31.

Next, the X-ray imaging operation will be described. When the exposure switch 21 is pressed, the X-ray generator 10 generates X-rays, the X-rays pass through the subject 1a and reach the imaging device 2. After the X-ray exposure has ended, the image signal SG is output in time series, and supplied to the AD converter 40 through the preamplifier 39 to be converted into digital data. The X-ray image data are stored in the main memory 33.

The image data stored in the main memory 33 are transferred to the video memory 34 by the DMA controller 38. The image data stored in the video memory 34 are subjected to the predetermined gradient conversion processing by the palette register 50, and then output to the DA converter 35. The DA converter 35 converts the image data into the video signal VD which is then output to the monitoring device 5 and the video printer 6. In this way, the X-ray image detected by the imaging device 2 is displayed on the screen of the monitoring device 5, or printed by the video printer to obtain a hard copy.

According to the gradient characteristic curve of the palette register 50 in the embodiment, in the case where each image data for one pixel consists of 8 bits in the same manner as that shown in FIG. 4, input data changes in the range of 0 to 255, and also output data changes in the range of 0 to 255. The boundaries of the interested region are preset to be X1 and X2, and the width of the interested region is preset to be W. When a ratio of an increment of output data to an increment of input data, i.e., the gradient of the curve is indicated by $\gamma$, a line which passes the origin (0, 0) and has $\gamma=1$ is set in the input data range of 0 to X1−1, a line which passes coordinates (X1, 0) and (X2, 255) and has $\gamma>1$ is set in the input data range of X1 to X2, and a line which passes the origin (0, 0) and has $\gamma=1$ is set in the input data range of X2+1 to 255.

As seen from the above, when input data is in the interested region, the conversion is conducted with gradient characteristics of $\gamma>1$ so that the gradient of the interested region is emphasized. In contrast, when input data is in the uninterested region, the conversion is conducted with gradient characteristics of $\gamma=1$ so that an image having a normal gradient is obtained. Therefore, an image of a site which is to be diagnosed is made easy to see by the gradient emphasis, and also images of surrounding sites can be observed simultaneously, resulting in that the diagnosis ability for the whole image is improved. When the interested region width setting switch 46 or the interested region position setting switch 47 is operated to change the width or position of the interested region so as to display an image while changing the gradient characteristic curve, it is easy to identify the size and position of the interested region, thereby improving the diagnosis ability based on an image.

Figure 11:
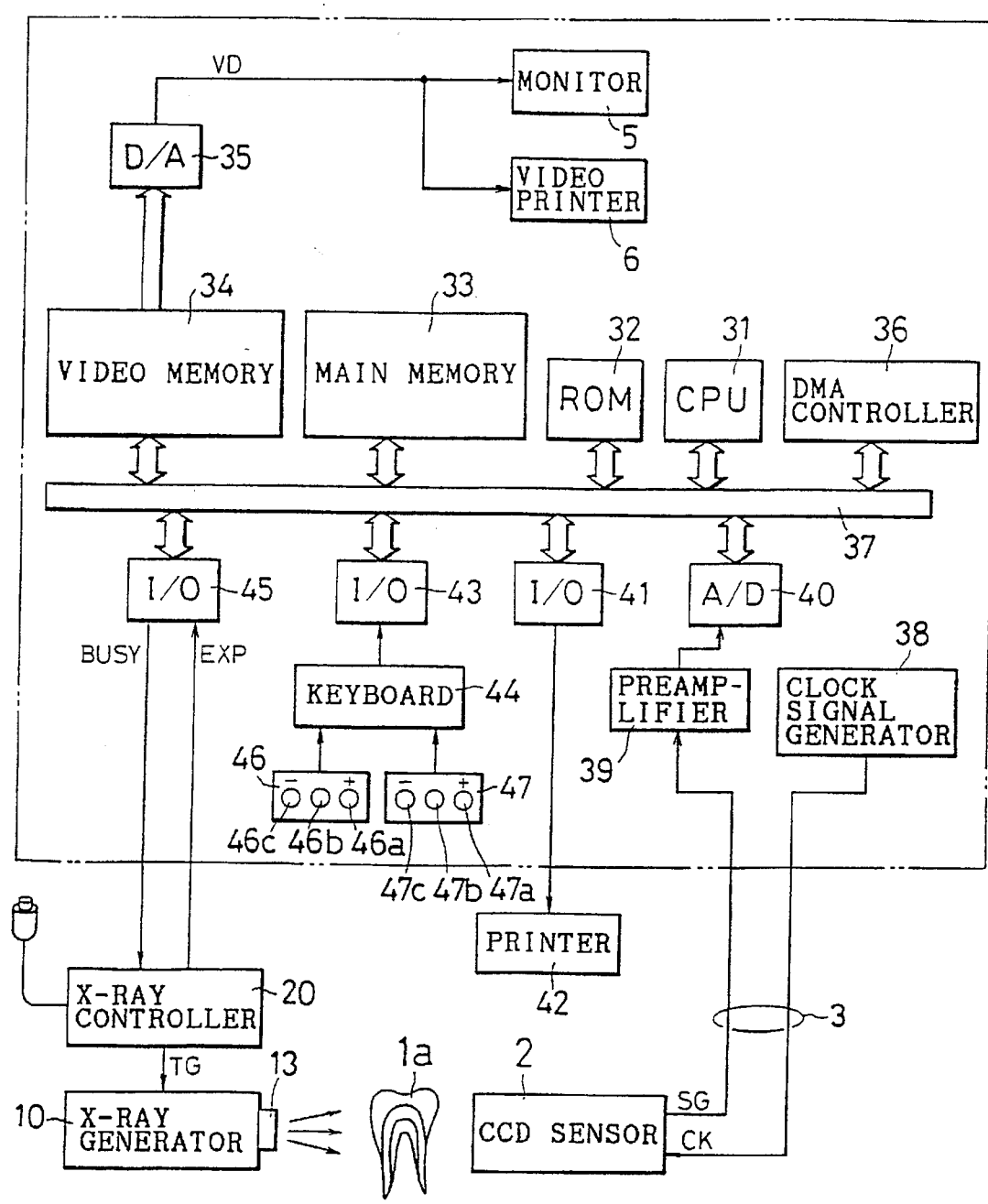
FIG. 11 is a block diagram showing the electrical configuration of an X-ray image displaying apparatus 4 which is a third embodiment of the invention.

FIG. 11 is a block diagram showing the electrical configuration of the X-ray image displaying apparatus 4 which is a third embodiment of the invention. The X-ray image displaying apparatus 4 of the embodiment is configured in a similar manner as that of FIG. 2 except that the CPU 31 can read out image data stored in the video memory 34, and execute the gradient conversion process on the read out image data, and the converted image data are again stored in the video memory 34.

The X-ray image displaying apparatus 4 comprises: the CPU 31; the ROM 32 for storing programs and data; the main memory 33 for storing data and the like; the video memory 34; the DA converter 35 for converting image data stored in the video memory 34 into a video signal VD; and the monitoring device 5 for receiving the video signal VD output from the DA converter 35, and for displaying an X-ray image on the CRT screen and the video printer 6 for displaying an X-ray image on the recording medium.

In the same manner as FIG. 2, the interested region width setting switch 46 for setting the width of an interested region, and the interested region position setting switch 47 for setting the position of the interested region are connected to the keyboard 44.

Next, the X-ray imaging operation will be described. When the exposure switch 21 is pressed, the X-ray generator 10 generates X-rays, the X-rays pass through the subject 1a and reach the imaging device 2. After the X-ray exposure is ended, the image signal SG is output in time series, and supplied to the AD converter 40 through the preamplifier 39 to be converted into digital data. The X-ray image data are stored in the main memory 33.

The image data stored in the main memory 33 are transferred to the video memory 34 by the DMA controller 36. The image data stored in the video memory 34 are output to the DA converter 35. The DA converter 35 converts the image data into the video signal VD which is then output to the monitoring device 5 and the video printer 6. In this way, the X-ray image detected by the imaging device 2 is not subjected to any gradient processing, and then displayed on the screen of the monitoring device 5, or printed by the video printer 6 to obtain a hard copy.

When the image data are to be subjected to the gradient processing, the CPU 31 reads out in sequence the image data stored in the video memory 34, and calculates a preset expression to sequentially execute the gradient conversion. The converted image data are again stored in the video memory 34. In the same manner as described above, the image data which have been subjected to the gradient conversion are output via the DA converter 35 to the monitoring device 5 and the video printer 6, so that an X-ray image on which the gradient conversion has been conducted is displayed.

Figure 12:
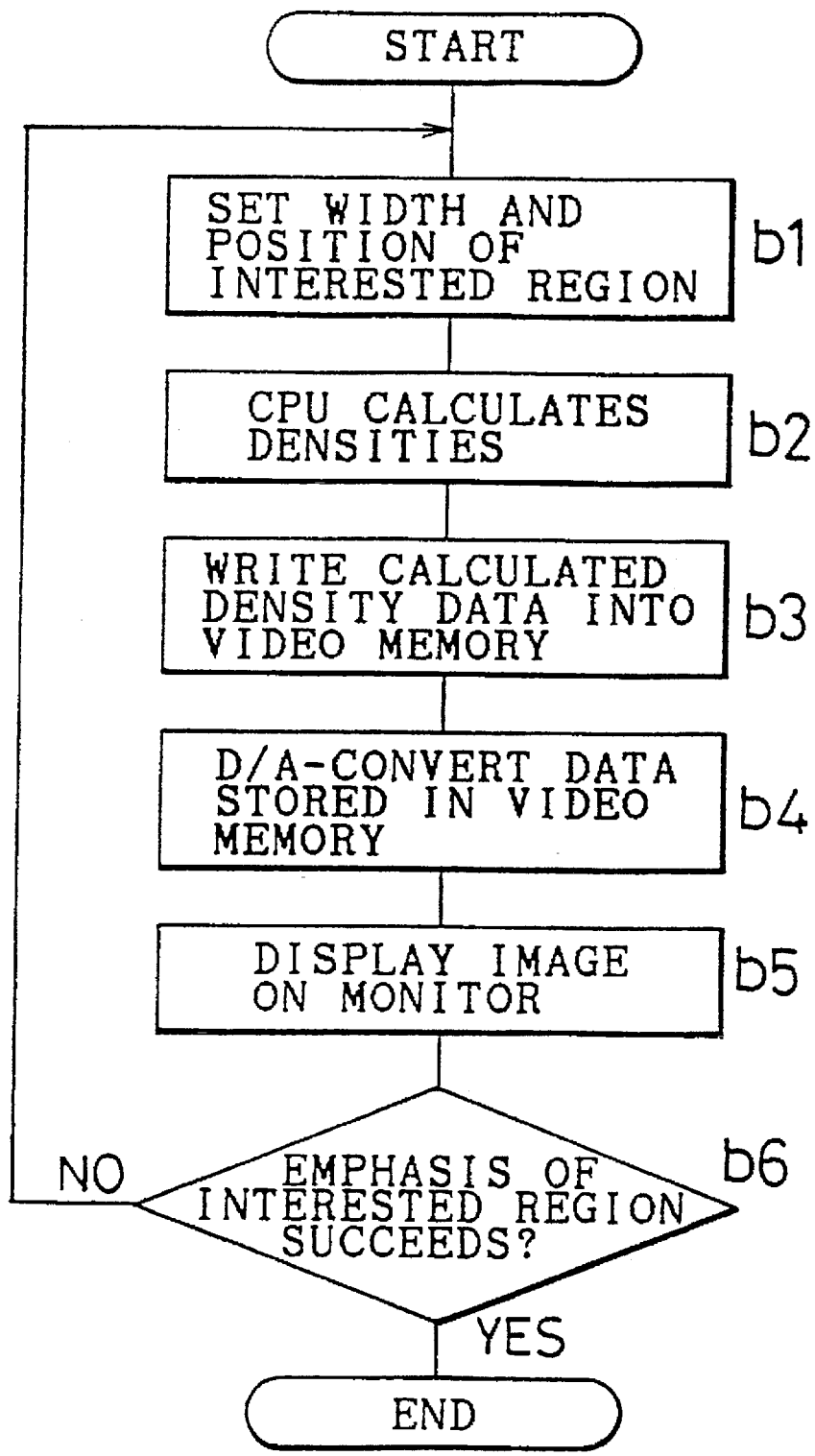
FIG. 12 is a flowchart showing the X-ray image displaying operation in the X-ray image displaying apparatus 4 of FIG. 11.

FIG. 12 is a flowchart showing the X-ray image displaying operation in the X-ray image displaying apparatus 4 of FIG. 11. First, in step b1, the interested region width setting switch 46 and the interested region position setting switch 47 which are connected to the keyboard 44 are operated to set the width and position of the interested region. In step b2, the CPU 31 reads out in sequence the image data stored in the video memory 34, and calculates densities by using an expression which is determined by the boundary values of the interested region.

The case where each image data for one pixel consists of 8 bits will be described. The boundaries of the interested region are preset to be X1 and X2. When input data is in the ranges of 0 to X1−1 and X2+1 to 255, a gradient conversion of γ=1 is conducted by outputting data which is identical with the input data. When input data is in the range of X1 to X2, a proportional distribution of (Z−X1)/(X2−X1)×256+X1 where Z is the input data is calculated, and the obtained data is set to be output data. This expression coincides with the gradient characteristic curves of FIG. 4. Namely, the expression coincides with the line which passes the origin (0, 0) and has γ=1 when input data is in the range of 0 to X1−1, the line which passes coordinates (X1, 0) and (X2, 255) and has γ>1 when input data is in the range of X1 to X2, and the line which passes the origin (0, 0) and has γ=1 when input data is in the range of X2+1 to 255.

As seen from the above, when input data is in the interested region, the conversion is conducted with gradient characteristics of γ>1 so that the gradient of the interested region is emphasized. In contrast, when input data is in the uninterested region, the conversion is conducted with gradient characteristics of γ=1 so that an image having a normal gradient is obtained. Therefore, an image of a site which by the diagnosed is made easy to see by the gradient emphasis, and also images of surrounding portions can be observed simultaneously, resulting in that the diagnosis ability for the whole image is improved.

Next, in step b3, the calculated density data are sequentially written into the video memory 34. The X-ray image data stored in the video memory 34 are converted in step b4 into the video signal VD. An X-ray image on which the gradient conversion has been conducted is displayed in step b5 by the monitoring device 5 or the video printer 6 and then used in the diagnosis. It is judged in step b8 whether or not the gradient emphasis of the interested region has been conducted successfully or the X-ray image has been converted into an image easy to see. If it is judged that the emphasis has been conducted successfully, the process is terminated. If it is judged that the emphasis has not been conducted successfully, the process returns to step hi to conduct again the setting of the width and position of the interested region, and the image display.

As described above, since the interested region width setting switch 46 or the interested region position setting switch 47 is operated so as to display an image while switching the gradient characteristic curves by changing the width or position of the interested region, it is easy to identify the size and position of the interested region, thereby improving the diagnosis ability based on an image. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for displaying an X-ray image wherein an X-ray is irradiated toward a subject, an image of the X-ray having passed through the subject is converted into an image signal, the image signal is digitized and stored in an image memory means, and thereafter X-ray image data consisting of digital values are subjected to gradient conversion and then displayed on a screen or a recording medium, said method comprising;

converting the X-ray image data with the gradient characteristics of γ>1 in the case where the values of the input data are in an interested region of a predetermined range, converting the X-ray image data with the gradient characteristic of γ=1 in the case where the values of the input data are uninterested region outside the predetermined range, and converting the input data inside the boundary of the interested region into output data consistently greater than 0 and wherein a ratio of an increment of output data of gradient characteristics to an increment data input data thereof is indicated by γ.

2. The method of claim 1, wherein the image is displayed with varying the width of said interested region.

3. The method of claim 1, wherein the image is displayed with varying the position of said interested region.

4. The method of claim 1, wherein the gradient conversion is conducted on both the density gradient and the chromaticity gradient, and the density gradient characteristics and the chromaticity gradient characteristics in the interested region are different from the density gradient characteristics and the chromaticity gradient characteristics in the uninterested region.

5. An apparatus for displaying an X-ray image comprising:

means for irradiating an X-ray toward a subject;

means for regulating X-ray irradiating conditions;

means for taking an image of the X-ray having passed through the subject and for converting the image into an image signal;

analog-digital conversion means for converting the image signal into digital values;

means for storing X-ray image data consisting of the digital values;

means for conducting a gradient conversion on the X-ray image data on the basis of predetermined gradient characteristics; and means for displaying the X-ray image data on which gradient conversion has been conducted, on a screen or a recording medium; and wherein;

when a ratio of an increment of output data of a table of gradient characteristics to an increment of input data thereof is indicated by $\gamma$, means for conducting a gradient conversion conducts conversion with the gradient characteristics of $\gamma>1$ in the case where the values of the input data values are in an interested region of a predetermined range, and conducts conversion with the gradient characteristics $\gamma=1$ in the case where the values of the input data values are in an uninterested region outside the predetermined range, while said means converts input data inside the boundary of the interested region into an output data consistently greater than 0.

6. The apparatus of claim 5, further comprising means for setting the width of said interested region.

7. The apparatus of claim 5, further comprising means for setting the position of said interested region.

8. The apparatus of claim 5, wherein the means for conducting a gradient conversion conducts both the density gradient conversion, and density gradient characteristics and the chromaticity gradient characteristics in the interested region are different from the density gradient characteristics and the chromaticity gradient characteristics in the uninterested region.

* * * * *